US006953396B2

(12) United States Patent
Paschke et al.

(10) Patent No.: US 6,953,396 B2
(45) Date of Patent: Oct. 11, 2005

(54) FABRIC FLOW RESTRICTION AND METHOD FOR CONVEYING A VOLUME OF AIR

(75) Inventors: Nicolas B. Paschke, Milwaukee, WI (US); Kevin J. Gebke, Dubuque, IA (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 59 days.

(21) Appl. No.: 10/427,303

(22) Filed: May 1, 2003

(65) Prior Publication Data

US 2003/0194965 A1 Oct. 16, 2003

Related U.S. Application Data

(63) Continuation-in-part of application No. 09/694,715, filed on Oct. 23, 2000, now Pat. No. 6,558,250.

(51) Int. Cl.[7] .............................................. F24F 13/072
(52) U.S. Cl. .......................... 454/306; 138/40; 454/903
(58) Field of Search ................................ 454/306, 903; 138/40, 41, 42, 43, 44, 45, 46

(56) References Cited

U.S. PATENT DOCUMENTS

| 1,319,267 | A | 10/1919 | Brown |
| 2,135,750 | A | 11/1938 | Harding |
| 2,406,272 | A | 8/1946 | Van Voorhees |
| 2,423,241 | A | 7/1947 | Kurth et al. |
| 2,466,362 | A | 4/1949 | Blake et al. |
| 2,595,408 | A | 5/1952 | Quest |
| 2,853,154 | A | 9/1958 | Rivers |
| 2,857,108 | A | 10/1958 | Wallace |

(Continued)

FOREIGN PATENT DOCUMENTS

| DE | 2 227 630 | 12/1973 |
| EP | 0 175 892 | 4/1986 |
| EP | 0 840 072 | 5/1998 |
| EP | 0 899 519 | 3/1999 |
| FR | 2 713 317 | 9/1995 |
| JP | 63-3143 | 1/1988 |
| JP | 03-110342 | 5/1991 |

OTHER PUBLICATIONS

Installation Instructions—Models PFT–XD & PFT–XHD Air Control Duct—Berner International Corporation (5/96).
Q–Duct Installation Instructions (1999).
Rite–Hite Drawing pp. (4) (Oct. 2001).

*Primary Examiner*—Harold Joyce
(74) *Attorney, Agent, or Firm*—Marshall, Gerstein & Borun LLP

(57) ABSTRACT

A fabric flow restriction and method for conveying a volume of air through a fabric duct prevents the violet popping that may occur with a fabric duct upon start-up. The fabric ducts are air permeable and/or include discharge openings that evenly disperse supply air from within the duct to a room being heated, cooled, ventilated, or otherwise conditioned by the air. The ducts are typically in a collapsed positioned prior to blower start-up. With the initial airflow, the ducts quickly fill with air and may make a popping sound at their distal ends as the airflow fills the entire fabric duct. The flow restrictions disclosed may be formed of a flexible fabric that has an airflow resistance that varies with radius across the flexible fabric. The flow restrictions may have a first region and a second region each with different resistances, for example. Varying the resistance across the fabric flow restriction reduces or eliminates the popping condition. The condition may also be eliminated by using a uniform resistance flow restriction that has a high resistance during start-up and a low resistance during normal operation.

17 Claims, 9 Drawing Sheets

U.S. PATENT DOCUMENTS

| | | |
|---|---|---|
| 3,151,962 A | 10/1964 | O'Dell |
| 3,195,296 A | 7/1965 | Janson |
| 3,204,391 A | 9/1965 | Schwab |
| 3,204,392 A | 9/1965 | Schwab |
| 3,357,088 A | 12/1967 | Hoffman et al. |
| 3,385,195 A | 5/1968 | Parker |
| 3,396,517 A | 8/1968 | Schwab |
| 3,538,686 A | 11/1970 | Schwab |
| 3,870,495 A | 3/1975 | Dixson et al. |
| 4,015,961 A | 4/1977 | Howard et al. |
| 4,048,911 A | 9/1977 | Petersen |
| 4,170,930 A | 10/1979 | Lind |
| 4,662,268 A * | 5/1987 | Beavers ............... 454/338 |
| 4,676,954 A | 6/1987 | Wilson |
| 4,805,521 A | 2/1989 | Eckebring et al. |
| 4,857,912 A | 8/1989 | Everett, Jr. et al. |
| 4,875,912 A | 10/1989 | Fulmer |
| 5,044,259 A | 9/1991 | Catan et al. |
| 5,111,739 A | 5/1992 | Hall |
| 5,117,893 A | 6/1992 | Morrison et al. |
| 5,123,595 A | 6/1992 | Doss |
| 5,167,577 A | 12/1992 | Kristensson |
| 5,346,426 A | 9/1994 | Kronfält |
| 5,422,078 A | 6/1995 | Colon |
| 5,490,813 A | 2/1996 | Danielsen et al. |
| 5,547,636 A | 8/1996 | Vick et al. |
| 5,618,324 A | 4/1997 | Sommer et al. |
| 5,655,963 A | 8/1997 | Paschke et al. |
| 5,690,720 A | 11/1997 | Spero |
| 5,769,708 A | 6/1998 | Paschke |
| 5,794,683 A * | 8/1998 | Kutzner ............... 165/41 |
| 5,924,597 A | 7/1999 | Lynn |
| 5,961,044 A | 10/1999 | Dalbec et al. |
| 6,117,005 A | 9/2000 | Weiss |
| 6,261,174 B1 | 7/2001 | Kuehn |
| 6,280,320 B1 | 8/2001 | Paschke et al. |
| 6,530,684 B1 * | 3/2003 | Kolb et al. ............ 366/176.1 |
| 6,561,225 B2 * | 5/2003 | Raftis ............... 138/41 |
| 6,626,754 B2 * | 9/2003 | Gebke et al. ........... 454/306 |

* cited by examiner

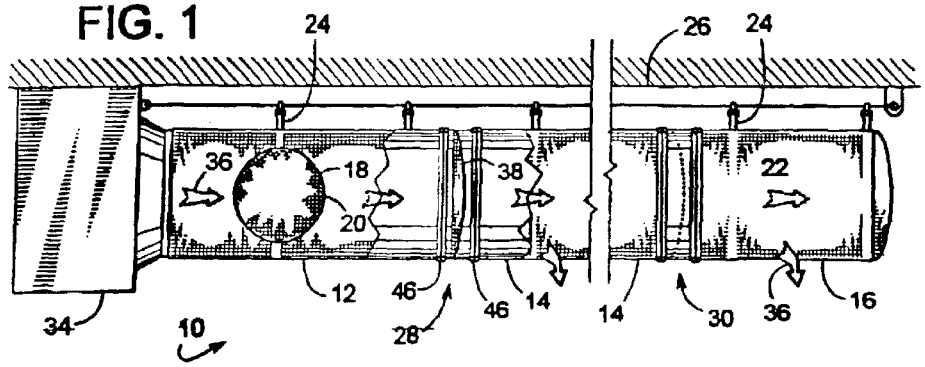
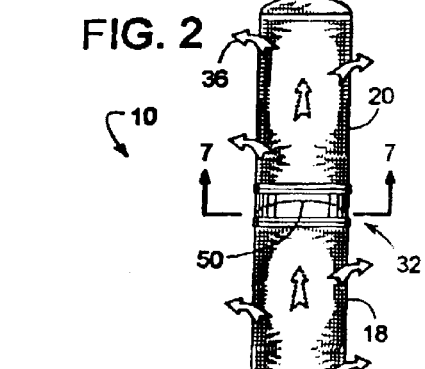
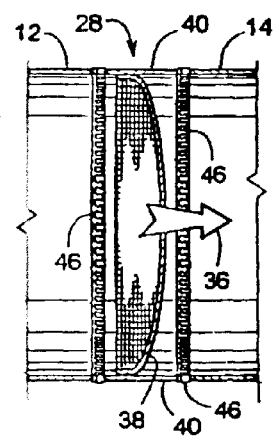
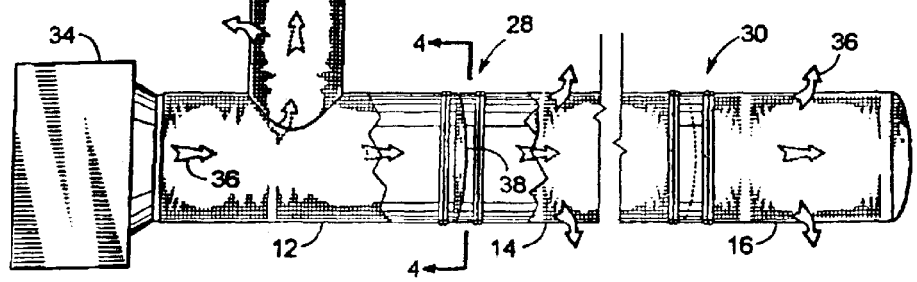

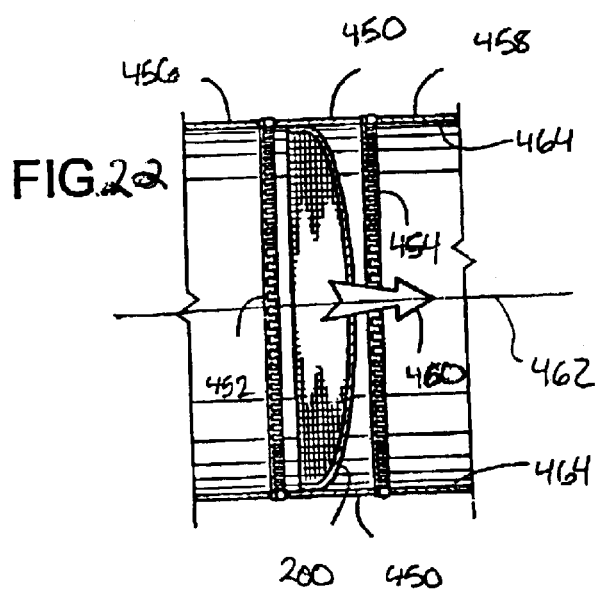

FABRIC FLOW RESTRICTION AND METHOD FOR CONVEYING A VOLUME OF AIR

CROSS-REFERENCE TO RELATED APPLICATION

This is a continuation-in-part application of U.S. Ser. No. 09/694,715, filed on Oct. 23, 2000, now U.S. Pat. No. 6,558,250.

BACKGROUND OF THE INVENTION

1. Field of the Invention

The subject invention generally pertains to fabric air ducts and more specifically to a damper for such a duct.

2. Description of Related Art

In HVAC systems (heating, ventilating, air conditioning), conditioned supply air discharged from a blower is often conveyed to various rooms or areas within a building by way of ductwork. Conventional sheet metal ductwork may include a main header duct that receives the forced air from the blower and distributes the air onto several branch ducts. The branch ducts, in turn, include one or more discharge registers that deliver the air to the various designated areas.

To ensure that each branch duct receives an appropriate volume of air to adequately condition or ventilate each room or area, airflow control dampers are often installed within the branch ducts, upstream of the ducts' discharge registers. Partially closing a damper prevents its respective branch duct from starving other branch ducts of their supply of air. The various dampers are adjusted until the supply air to each of the branches is properly apportioned, which is a process known as balancing the airflow.

In addition to dampers disposed within the ducts, in some cases, additional dampers are installed at each discharge register. The dampers at the discharge registers allow more individualized control of airflow through each register or allow a register to be shut off completely. The occupants of the building typically adjust the individual dampers at each register, while the other dampers within the ducts are thermostatically controlled or manually adjusted and set when the HVAC system is first installed.

Balancing the airflow is readily accomplished when the ductwork, dampers and registers are all made of relatively rigid sheet metal; however, in many cases, air ducts are made of fabric. Fabric ducts typically have a flexible fabric wall that is porous and/or includes additional holes along its length for evenly dispersing air, from within the duct, to the areas being conditioned or ventilated. An example of such a duct is a DUCTSOX by the Frommelt Safety Products Corporation of Milwaukee, Wis. Fabric ducts are often suspended from a horizontal cable or track by way of several hangers distributed along the length of the duct. Fabric is often preferred over sheet metal when cleanliness, even air dispersion, condensation control, or appearance is a significant concern. Unfortunately, using conventional metal dampers within fabric ducts creates some problems.

First, the pliability of fabric may inhibit the duct from effectively supporting the weight of a metal damper without excessive distortion or sagging of the duct. Second, the supply air blower turning on and off to meet the conditioning demand of the building causes a fabric duct to alternately inflate and deflate. When the duct is deflated, a metal damper may create an unsightly bulge in the duct.

Fabric ducts are also affected by problems during the initial operation of the duct. Unlike metal ducts, fabric ducts maintain their inflated shaped only when they are receiving airflow from the blower. When there is no airflow, the fabric duct is in a collapsed state because there is no static air pressure in the fabric duct. The fabric duct also experiences a shrinkage in that its distal length is shorted somewhat as the duct is in a recoiled position, in comparison to its length when fully inflated. From the shrunken and collapsed position, when the airflow is initiated, the blower feeds a large stream of air that must eventually erect the entire fabric duct. The airflow is typically quite high and as it fills the fabric duct the most distal end of the duct, farthest away from the blower, pops out into the erect position. A large popping sound results. Not only is the popping sound annoying to personnel nearby, the violent fabric duct movement that causes the sound may cause wear over time.

SUMMARY OF THE INVENTION

In accordance with an example, provided is an air duct assembly including a first duct comprising a fabric; a second duct comprising a fabric; and a fabric flow restriction having a first flow resistance over a first region and a second flow resistance different than the first flow resistance over a second region, the fabric flow restriction being interposed between the first duct and the second duct.

In accordance with another example, provided, for use in a fabric duct, is a fabric flow restriction including a sleeve; a releasable fastener attached to the sleeve and adapted to fasten the sleeve to the fabric duct for the communication of airflow between the sleeve and the fabric duct; and a fabric flow restriction having a resistance that varies with radius across the fabric flow restriction.

In accordance with another example, provided is a method of conveying a volume of air including conveying the air through a first fabric duct; and conveying the air through a fabric flow restriction that is upstream of the first fabric duct, wherein the fabric flow restriction has a first flow resistance over a first region and a second flow resistance different than the first flow resistance over a second region.

BRIEF DESCRIPTION OF THE DRAWINGS

FIG. 1 is a front view with a partial cut-away showing a fabric air duct assembly that includes fabric flow restrictions.

FIG. 2 is a bottom view of FIG. 1.

FIG. 3 is a closer view of the cut-away portion of FIG. 1.

FIG. 22 is an illustration of a portion of a fabric air duct assembly that includes a fabric flow restriction.

DESCRIPTION OF THE PREFERRED EMBODIMENT

Figure 4:
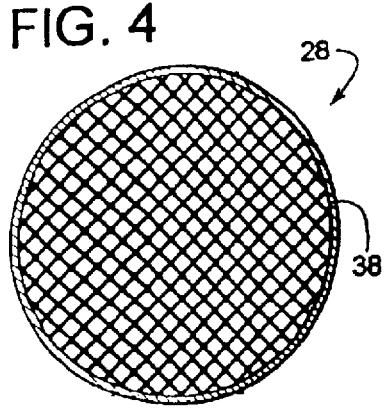
FIG. 4 is a cross-sectional view taken along line 4—4 of FIG. 2.

An air duct assembly 10, shown in FIGS. 1 and 2, includes several fabric ducts 12, 14, 16, 18 and 20 that are suspended within a building 22 by series of connectors 24, which hang from one or more elongated support members 26, such as a track or a taut cable. Several fabric flow restrictions 28, 30, and 32 help balance the volume of airflow through the ducts. An air handler 34, such as a fan or blower disposed within an enclosure, forces air 36 into a main duct 12. In this example, duct 12 consists of fabric; however, it could also be made of sheet metal or of another material. The term, "fabric," refers to any pliable sheet of material that may or may not be air permeable or porous. Examples of a fabric include, but are not limited to, woven or knit cloth, flexible plastic sheeting that is not necessarily woven, plastic impregnated cloth, fiber reinforced plastic, and various combinations thereof.

Main duct 12 feeds air 36 into two branch ducts 14 and 18, which in turn feed air 36 into two other branch ducts 16 and 20 respectively. Thus, ducts 14 and 16 are in series-flow relationship to each other, and so are ducts 18 and 20. Duct 14 is in parallel-flow relationship with ducts 18 and 20 and so is duct 16. The term, "parallel-flow" refers to airflow being split between two different paths. Forced air 36 from air handler 34 or another source inflates each of the fabric ducts to a tubular shape, as shown. Porosity and/or other openings in the ducts' fabric allow the air within ducts 14, 16, 18 and 20 to disperse into a room or area that is being ventilated or otherwise conditioned by air 36. In some cases, main duct 12 may be air-permeable to disperse some air into part of the building as well.

Flow restrictions 28, 30 and 32 each have a flow resistance that has been individually set to apportion the airflow being discharged through the fabric wall of each of ducts 14, 16, 18 and 20. The term, "flow resistance" is a measure of a restriction's ability to create a pressure drop for a given volume of airflow through the restriction. Thus, for a given volume of airflow, a higher pressure drop is created by a restriction having a higher flow resistance. Likewise, for a given pressure drop across a restriction, a lower volume of airflow is conveyed through a restriction having a higher flow resistance. The flow resistance of a flow restriction can be set or adjusted by a variety of methods, depending on the structural design of the restriction.

Figure 5:
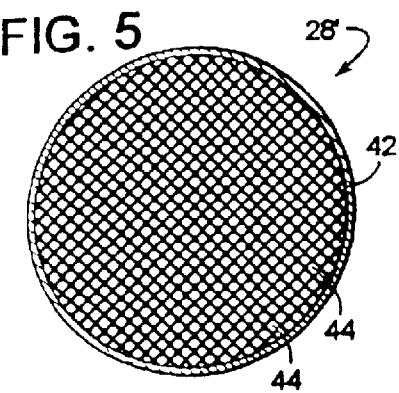
FIG. 5 is similar to FIG. 4 but of another flow restriction.

For restriction 28, for example, flow resistance is created by an air-permeable fabric mesh 38 whose periphery is sewn or otherwise attached to a fabric sleeve 40, as shown in FIG. 3. To provide relatively low flow resistance, mesh 38 can be relatively course, as shown in FIG. 4. To provide greater flow resistance, an alternate, finer mesh 42 with more openings 44 per square-inch can be used, as shown in FIG. 5. Greater flow resistance can also be provided by a mesh having the same quantity or even less openings than mesh 38, but with openings that are smaller than those of mesh 38.

Figure 6:
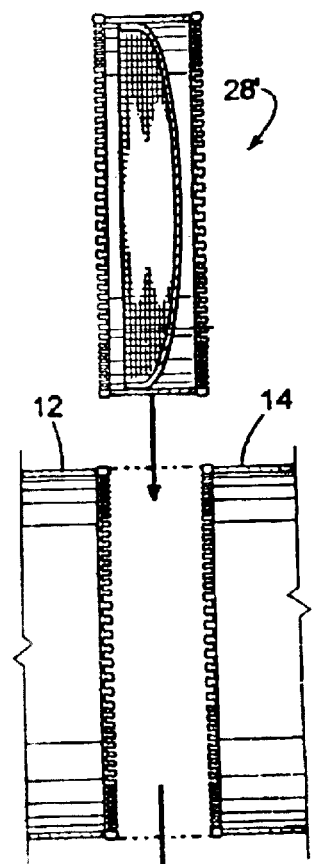
FIG. 6 illustrates manipulating a fabric flow restriction to vary the volume of airflow therethrough.

To manipulate or adjust the flow resistance, sleeve 40 is provided with a releasable fastener 46 at each end to releasably attach to ducts 12 and 14. This allows restriction 28 to be readily replaced by another restriction 28' having a more desirable flow resistance, as shown in FIG. 6. Fastener 46 has been schematically illustrated to encompass a variety of releasable fasteners including, but not limited to, a zipper; a touch-and-hold fastener, such as VELCRO; and snaps.

Figure 7:
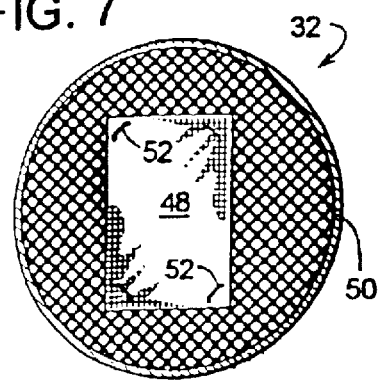
FIG. 7 is a cross-sectional view taken along line 7—7 of FIG. 2.

Flow resistance can also be adjusted by varying the size of a patch 48 that overlays a fabric mesh 50 of a flow restriction, such as restriction 32, as shown in FIG. 7. Here, patch 48 is of a fabric that is less air-permeable than mesh 50, which thus further restricts airflow. Patch 48 can be attached to mesh 50 by a variety of fasteners including, but not limited to, safety pins 52, snaps, touch-and-hold fasteners, adhesive, etc. Cutting or folding of patch 48 can be used to adjust its size or effective area.

Figure 8:
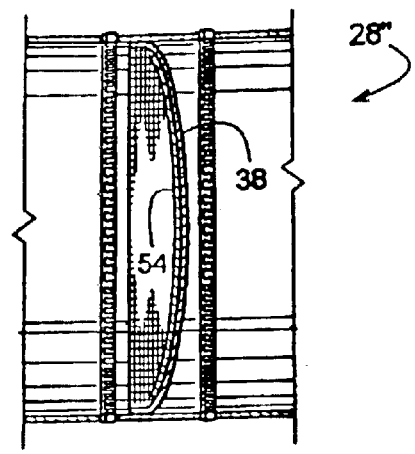
FIG. 8 is similar to FIG. 3, but with another mesh added to the flow restriction.
Figure 9:
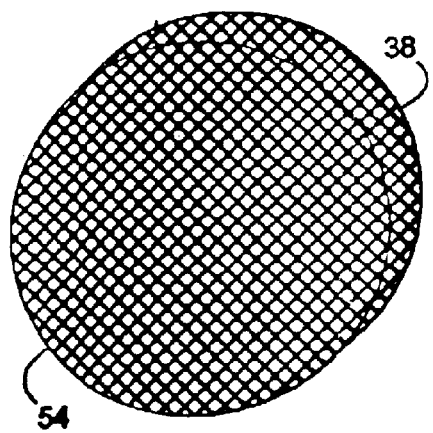
FIG. 9 shows one configuration of how the two meshes shown in FIG. 8 can overlap one another.
Figure 10:
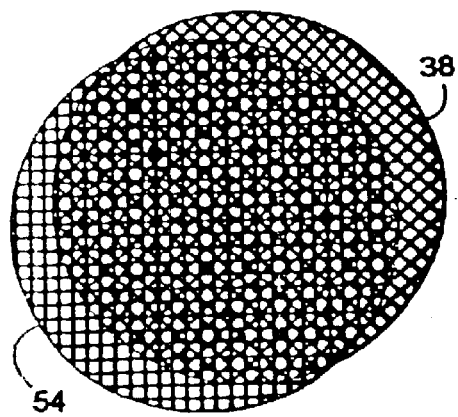
FIG. 10 shows another configuration of how the two meshes shown in FIG. 8 can overlap one another.

In another embodiment, shown in FIGS. 8, 9 and 10, adjustable flow resistance is provided by overlaying a second fabric mesh 54 over mesh 38 to create a flow restriction 28". Placing the two meshes 38 and 54 in rotational registry, as shown in FIG. 9, aligns the respective openings of meshes 38 and 54 to provide restriction 28" with one level of flow resistance. Rotating mesh 38 relative to mesh 54, as shown in FIG. 10, then provides restriction 28" with more flow resistance. Although, meshes 38 and 54 may be concentrically aligned to each other, FIGS. 9 and 10 show them slightly offset to more clearly illustrate the rotational orientation of each mesh 38 and 54.

Figure 11:
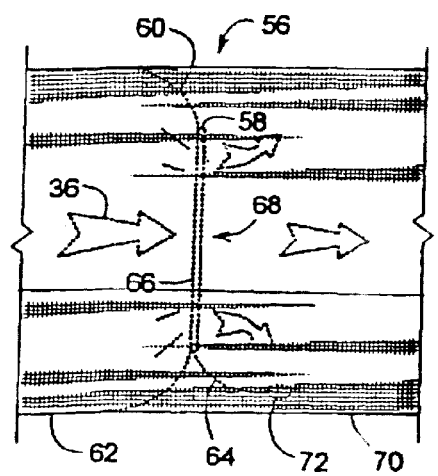
FIG. 11 is a side view of a fabric flow restriction disposed inside and situated between an upstream fabric duct and a downstream fabric duct.
Figure 12:
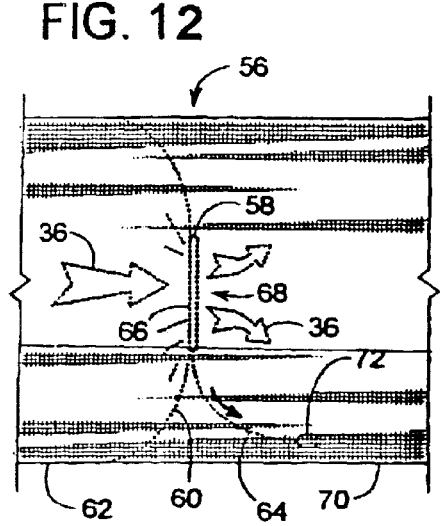
FIG. 12 is similar to FIG. 11, but with the flow restriction providing greater flow resistance.

For another flow restriction 56, shown in FIGS. 11 and 12, adjustable flow resistance is provided by varying the tightness of a cinch 58. Here, restriction 56 includes an annular fabric web 60 whose perimeter is sewn or otherwise attached to a fabric duct 62. A constrictable elongated member 64, such as a string, cable, strap, etc., feeds through a sleeve 66 that lines a central opening 68 of web 60. Drawing member 64 tighter constricts opening 68, which increases the flow resistance of restriction 56, and thus reduces the airflow to a downstream fabric duct 70, as shown in FIG. 12. Loosening member 64, as shown in FIG. 11, widens opening 68 to provide less flow resistance. Once achieving a desired flow resistance, member 64 can be held in place by some type of conventional fastener or even by a simple knot. Access to member 64 can be provided by a closable access opening through duct 62 or 70, or a pull-ring 72 can be provided on the exterior of the ducts by feeding member 64 through a small hole in duct 70. The fabric of web 60 can be porous or impermeable to air, depending the desired range of flow restriction.

Figure 13:
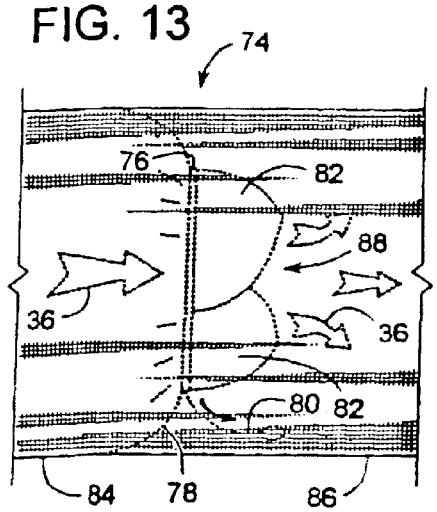
FIG. 13 is a side view of another fabric flow restriction disposed inside and situated between an upstream fabric duct and a downstream fabric duct.
Figure 14:
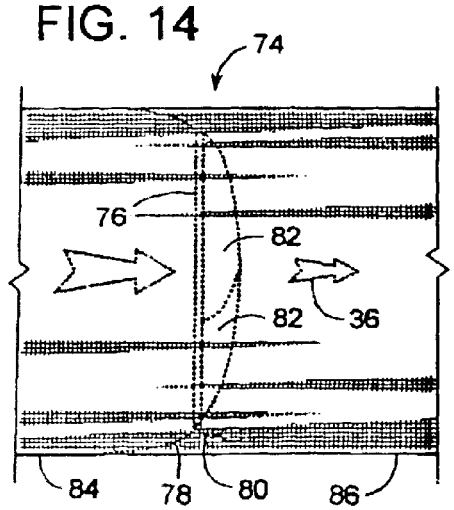
FIG. 14 is similar to FIG. 13, but with the flow restriction providing greater flow resistance.

In another flow restriction 74, similar to restriction 56 and shown in FIGS. 13 and 14, adjustable flow resistance is provided by varying the tightness of a cinch 76 about an inner diameter of an annular fabric web 78; however, flow resistance decreases with the tightness of cinch 76. When a constrictable elongated member 80 of cinch 76 is loose, as shown in FIG. 14, overlapping fabric flaps 82 extending from web 78 tend to close upon themselves to resist airflow from an upstream fabric duct 84 to a downstream fabric duct 86. Upon tightening member 80, as shown in FIG. 13, flaps 82 tend to pucker, which creates a central opening 88 in restriction 74 that reduces flow resistance. Flow restriction 74 can be created by adapting the structure disclosed in U.S. Pat. No. 5,655,963, which is specifically incorporated by reference herein.

Figure 15:
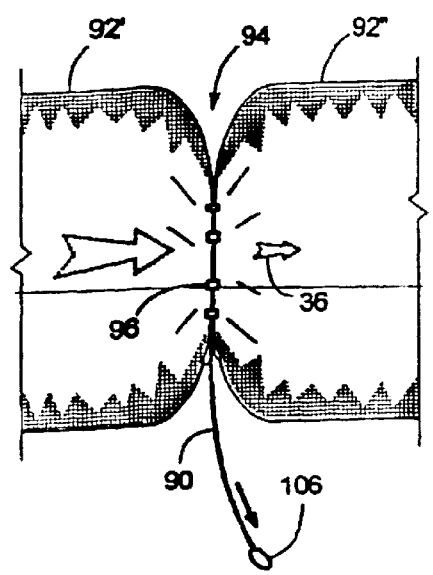
FIG. 15 is a side view of another fabric flow restriction interposed between an upstream fabric duct and a downstream fabric duct.
Figure 16:
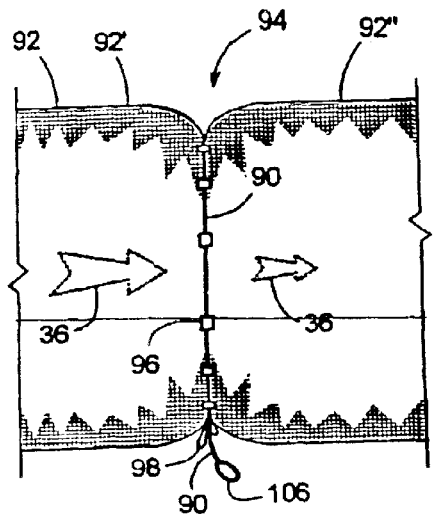
FIG. 16 is similar to FIG. 15, but with the flow restriction providing less flow resistance.
Figure 17:
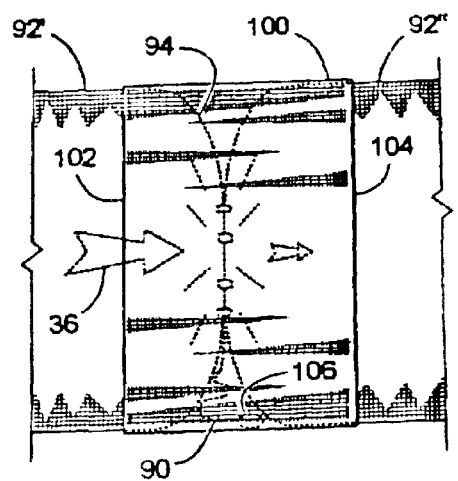
FIG. 17 is similar to FIG. 15, but with a fabric shroud covering the flow restriction.

Adjustable flow resistance can also be provided by simply wrapping a constrictable member 90 about the exterior of a continuous fabric duct 92, thereby creating an upstream duct 92' and a downstream duct 92" with a fabric flow restriction 94 between the two, as shown in FIGS. 15 and 16. Tightening member 90 chokes off air 36 flowing from duct 92' to duct 92", as shown in FIG. 15. Loosening member 90, as shown in FIG. 16, reduces the air resistance. Threading member 90 through loops 96 attached to ducts 92' and 92" can help keep member 90 in position. A knot 98 or some other type of fastener can be used to hold member 90 at its proper constriction.

To improve the appearance of ducts 92' and 92", a tubular fabric shroud 100 can be added to cover flow restriction 94. Shroud 100 can be attached to ducts 92' and/or 92" by a conventional fastener, examples of which include, but are not limited to, a zipper, touch-and-hold fastener, clips, snaps, buttons, adhesive, and a sewn seam. Access to member 90 can be provided by having at least one end 102 or 104 of shroud 100 removably attached or unattached to duct 92' or 92". Access to member 90 can also be provided by moving a pull-ring 106 to the exterior of shroud 100 by feeding member 90 through a small hole in shroud 100 or by feeding it through a small gap between shroud 100 and duct 92' or 92".

Figure 18:
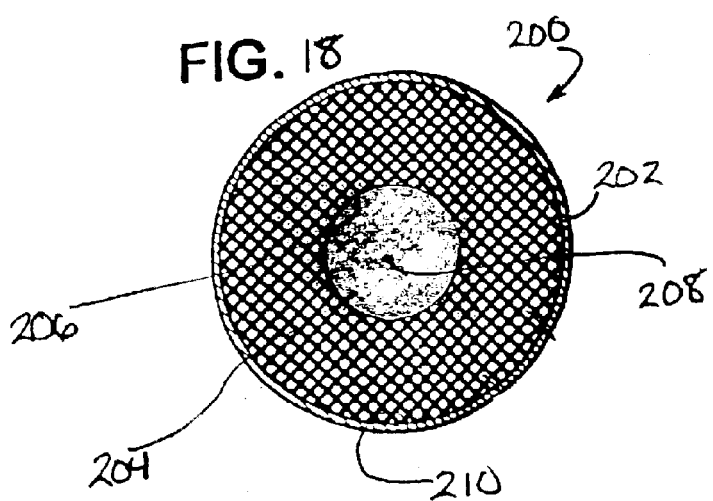
FIG. 18 is a view similar to that of FIG. 4 but of another fabric flow restriction that may be used in a duct assembly.

To address the problem of popping experienced by some fabric ducts, FIGS. 18–21 provided example flow restrictions having variable resistance across the flow restriction. FIG. 18 shows a fabric flow restriction 200 that may be used in a fabric duct in place of the flow restrictions shown above. The flow restriction 200 includes a first region 202 having a first flow resistance and a second region 204 having a second flow resistance. The first region 202 is mesh in the example of FIG. 18, and the second region 204 is an open cavity. Upon start-up, airflow from an upstream blower passes through the second region 204 at a higher rate than the first region 202, causing a varying air flow, in cross-section, in the downstream duct. The illustrated restriction 200 may include a stability member at an inner edge 206 to reduce wear. The stability member may be formed of a mesh fabric folded onto itself or a flexible member.

The fabric flow restriction 200 has a variable resistance that varies with radius from a central axis 208 to an outer edge 210. The variable resistance may exhibit a step-wise variability, like that shown in FIG. 18. The variable resistance may take on any desired variability pattern, including a continuously, radially varying resistance measured from the central axis 208. In addition to a step-wise pattern, other example resistance versus radius patterns include parabolic and Gaussian patterns. Further still, the variable resistance flow restriction of FIG. 18 may be replaced with a uniform resistance restriction that has a sufficiently high flow resistance to prevent popping, but a sufficiently low resistance to allow normal operation of the fabric duct.

Figure 19:
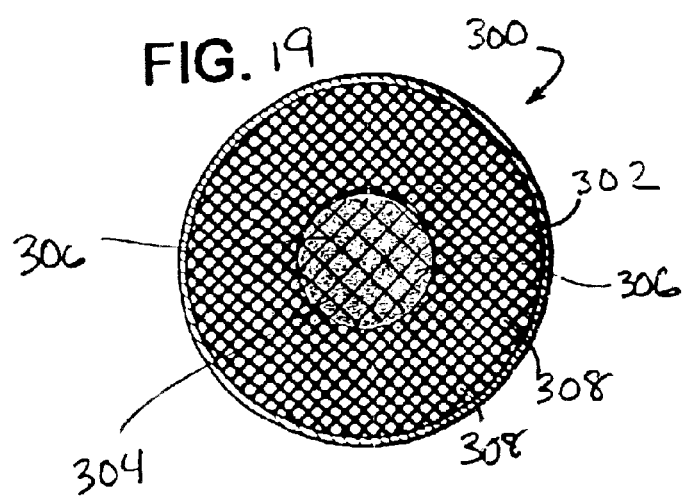
FIG. 19 is a view similar to that of FIG. 18 but of another fabric flow restriction.

FIG. 19 shows a flow restriction 300 similar to the restriction 200. The restriction 300 includes a first region 302 and a second region 304, in place of the opening 204. The second region 304 is formed of a mesh having a higher porosity and lower resistance than the mesh forming the first region 302. Holes 306 in the region 304 are larger than holes 308 spanning region 302. The differences in the porosity between the first region 302 and the second region 304 may be chosen based on the size, cross-sectional shape and length of the downstream fabric duct connected thereto.

The first region 302 and the second region 304 may be connected together through a fastener, such as VELCRO, a zipper, a tie, or a series of snaps. Alternatively, the regions 302 and 304 may be fused or bonded together or formed on a single mesh sheet that has been exposed to different perforations for each of the two regions 302 and 304.

Figure 20:
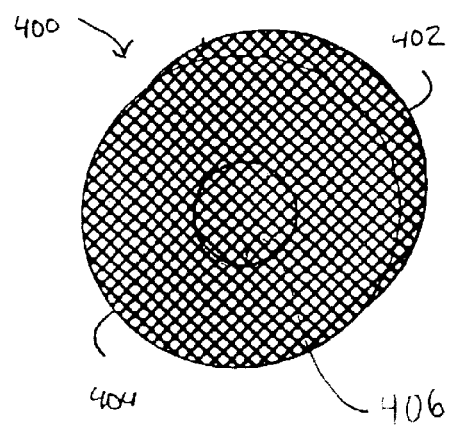
FIG. 20 illustrates a fabric flow restriction formed of two overlaid meshes.
Figure 21:
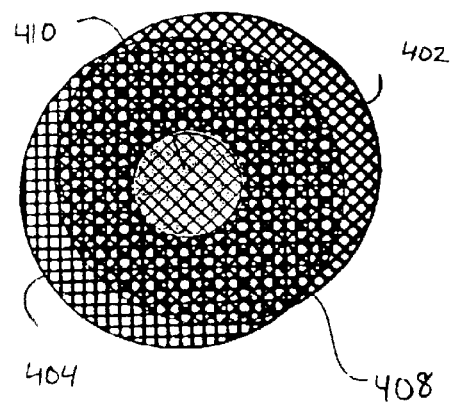
FIG. 21 shows another configuration of how the two meshes shown in FIG. 20 can be overlaid.

FIGS. 20 and 21 show yet another example restriction. A fabric flow restriction 400 having a variable resistance is formed of a first mesh sheet 402 and a second mesh sheet 404. In the illustrated example, the first mesh sheet 402 has an opening over a first region 406. In the aligned position of FIG. 20, the restriction 400 has the same resistance at all radial positions. When the second mesh 404 is rotated relative to the position of FIG. 20, the meshes 402 and 404 combine to form a first region 408 (partially shown) having a lower porosity, and thus higher resistance, than a second region 410.

The fabric flow restrictions 200, 300, and 400 may be attached to a fabric duct, using the techniques described above. By way of example, FIG. 22 shows the restriction 200 attached to a sleeve 450 having a first, releasable fastener 452 and a second, releasable fastener 454 for fastening the sleeve 450 to a fabric duct 456 and a fabric duct 458, respectively. Suitable releasable fasteners are described herein.

In the illustrated configuration, the flow restriction 400 may receive a substantially uniform pressure airflow or laminar airflow from the duct 456 and convert that airflow into a radius dependent airflow 460 at the entrance of the duct 458, resulting in an airflow pressure near a central axis 462 thereof being higher than the air flow pressure at an outermost radius 464 of the duct 458. This has the effect of reducing the popping effect at the end of the duct since the restriction 400 has reduced the popping potential of the advancing air (also known as the static regain potential) by introducing a programmed, defined pressure drop in that advancing air. Without the restriction 400, the end of the duct would be subject to the entire static regain potential, but the pressure drop provided by restriction 400 prevents this from happening. At the same time, the variable nature of the restriction 400 creates a radius dependent airflow that maintains some (albeit reduced) airflow at the periphery of the duct as compared to the center. This helps prevent the airflow as restricted by restriction 400 from becoming turbulent and causing a fluttering of the duct walls. Reduction of popping is thus provided without the drawback of turbulent flow. The flow restrictions 200, 300 and 400 share this functionally.

Any of the restrictions shown in FIGS. 18-21 may be used in such a sleeve and fastener configuration as shown in FIG. 22. Furthermore, the configuration of FIG. 22, while shown with two fasteners, may instead have a single fastener or no fastener. The restrictions may be formed integrally with a fabric duct, for example, on an inner surface of the duct.

The flow restrictions 200, 300, and 400 may be disposed at various locations along a fabric duct. It is preferred, however, to position the flow restriction upstream of the distal-most end of the downstream duct, where popping is most likely to occur. By way of example, for a duct having a length, L, as measured from the point of entrance of the blower's airflow into the duct, the flow restriction may be positioned from between 0 to 0.9 L downstream of that point of entrance, leaving approximately no less than least 10% of the duct downstream of the fabric flow restriction. Generally, however, the flow restrictions may be positioned at any location within a duct assembly to provide a large restriction upon blower start-up and a relatively low restriction during normal operation of the fabric duct.

Although the invention is described with reference to a preferred embodiment, it should be appreciated by those skilled in the art that various modifications are well within the scope of the invention. Therefore, the scope of the invention is to be determined by reference to the claims that follow.

We claim:

1. An air duct assembly comprising:
   a first duct comprising a fabric;
   a second duct comprising a fabric; and
   a fabric flow restriction having a first flow resistance over a first region and a second flow resistance different than the first flow resistance over a second region, the fabric flow restriction being interposed between the first duct and the second duct.

2. The air duct assembly of claim 1, wherein the fabric flow restriction comprises a mesh extending over the second region, wherein the mesh defines an opening over the first region.

3. The air duct assembly of claim 1, wherein the fabric flow restriction comprises a first fabric extending over the first region and a second fabric extending over the second region, wherein the first fabric has a first porosity different than a second porosity of the second fabric.

4. The air duct assembly of claim 1, wherein the fabric flow restriction has a first porosity over the first region and a second porosity over the second region, different than the first porosity.

5. The air duct assembly of claim 1, wherein the fabric flow restriction is interposed between the first duct and the second duct to convert a substantially uniform airflow within the first duct into a radius dependent airflow in the second duct.

6. The air duct assembly of claim 5, wherein the radius dependent airflow is higher at a central axis than at an outermost radius.

7. The air duct assembly of claim 1, wherein at least one of the fabric of the second duct or the fabric of the first duct is porous.

8. For use with a first fabric duct and a second fabric duct, a fabric flow restriction comprising:
   a sleeve;
   a releasable fastener attached to the sleeve and adapted to fasten the sleeve to the first fabric duct and to the second fabric duct for the communication of airflow between the sleeve and the first fabric duct and between the sleeve and the second fabric duct; and
   a fabric flow restriction having a resistance that varies with radius across the fabric flow restriction, the fabric flow restriction being interposed between the first fabric duct and the second fabric duct.

9. The fabric flow restriction of claim 8, wherein the resistance of the fabric flow restriction is lowest at a central axis and highest at an outermost radius.

10. The fabric flow restriction of claim 8, wherein the fabric flow restriction comprises a mesh defining a first region having a first resistance and a second region having a second resistance different from the first resistance.

11. The fabric flow restriction of claim 10, wherein the first region has a lower porosity than the second region.

12. The fabric flow restriction of claim 10, wherein the resistance varies with radius in a step-wise manner.

13. The fabric flow restriction of claim 10, wherein the resistance varies with radius in a continuous manner.

14. A method of conveying a volume of air, comprising:
    conveying the air through a first fabric duct;
    conveying the air through a fabric flow restriction that is downstream of the first fabric duct, wherein the fabric flow restriction has a first flow resistance over a first region and a second flow resistance different than the first flow resistance over a second region; and
    conveying the air through a second fabric duct downstream of the fabric flow restriction.

15. The method of claim 14, wherein the first fabric duct is air-permeable.

16. A method of conveying a volume of air, comprising:
    conveying the air through a first fabric duct; and
    conveying the air through a fabric flow restriction that is upstream of the first fabric duct, wherein the fabric flow restriction has a first flow resistance over a first region and a second flow resistance different than the first flow resistance over a second region, wherein the fabric flow restriction comprises a mesh extending over the second region and defining an opening over the first region.

17. A method of conveying a volume of air, comprising:
    conveying the air through a first fabric duct; and
    conveying the air through a fabric flow restriction that is upstream of the first fabric duct, wherein the fabric flow restriction has a first flow resistance over a first region and a second flow resistance different than the first flow resistance over a second region, wherein the fabric flow restriction comprises a first fabric extending over the first region and a second fabric extending over the second region, wherein the first fabric has a first porosity different the a second porosity of the second fabric.

* * * * *